(12) United States Patent
Shigeta (10) Patent No.: US 9,405,747 B2
(45) Date of Patent: *Aug. 2, 2016

(54) INFORMATION DISPLAY SYSTEM AND DOT PATTERN PRINTED MATERIAL

(75) Inventor: Tatsuo Shigeta, Chiba (JP)

(73) Assignee: Think Laboratory Co., Ltd., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/983,158

(22) PCT Filed: Mar. 28, 2012

(86) PCT No.: PCT/JP2012/058125
§ 371 (c)(1),
(2), (4) Date: Sep. 5, 2013

(87) PCT Pub. No.: WO2012/133528
PCT Pub. Date: Oct. 4, 2012

(65) Prior Publication Data
US 2013/0334302 A1  Dec. 19, 2013

(30) Foreign Application Priority Data
Mar. 31, 2011  (JP) .................. 2011-077385

(51) Int. Cl.
G06K 19/06 (2006.01)
G06F 17/00 (2006.01)
G06K 7/10 (2006.01)
G06F 17/30 (2006.01)

(52) U.S. Cl.
CPC ............ *G06F 17/30* (2013.01); *G06K 19/0614* (2013.01); *G06K 19/06037* (2013.01)

(58) Field of Classification Search
CPC .. G06F 17/30; G06K 19/06; G06K 19/06009; G06K 19/06037; G06K 19/06046; G06K 19/0614
USPC .............................. 235/375, 454, 462.01, 494
See application file for complete search history.

(56) References Cited

U.S. PATENT DOCUMENTS 6,267,052 B1 * 7/2001 Hill ..................... B41M 3/008
                                                         101/211
6,547,382 B1 * 4/2003 Shirota et al. ................. 347/100

(Continued)

FOREIGN PATENT DOCUMENTS

CN  101044026 A  9/2007
EP  2 312 502 A1  4/2011

(Continued)

OTHER PUBLICATIONS

International Preliminary Report on Patentability issued Oct. 17, 2013 for corresponding PCT Application No. PCT/JP2012/058125.

(Continued)

*Primary Examiner* — Thien M Le
*Assistant Examiner* — April Taylor
(74) *Attorney, Agent, or Firm* — Michael Best & Friedrich LLP (57) ABSTRACT

Provided is an information display system and a dot pattern printed material to be used for the same, which are capable of easily displaying information only by reading a dot pattern, easy for update of the information, and capable of printing an even less visible dot pattern as compared to the conventional case. The information display system includes: a dot pattern printed material including a dot pattern having coordinate position code information, the dot pattern being printed on a printing object through gravure printing in a less visible and optically readable manner; optical reading means; information transfer means for transferring, to a server device, the coordinate position code information that is read by the optical reading means; a server device for outputting associated information that is accumulated in advance in association with the coordinate position code information; and information display means for displaying the associated information output from the server device. The dot pattern printed material is obtained by printing the dot pattern through the gravure printing with carbon black ink on a black printing layer that is formed with cyan ink, magenta ink, and yellow ink.

6 Claims, 5 Drawing Sheets

(56) References Cited

U.S. PATENT DOCUMENTS

| | | | |
|---|---|---|---|
| 8,245,931 B2* | 8/2012 | Shigeta | 235/454 |
| 2006/0154559 A1* | 7/2006 | Yoshida | 446/297 |
| 2007/0186791 A1* | 8/2007 | Kim et al. | 101/151 |
| 2008/0088860 A1* | 4/2008 | Yoshida | B41M 3/144 358/1.8 |
| 2010/0207987 A1* | 8/2010 | Sano | B41J 2/2114 347/15 |
| 2011/0132986 A1 | 6/2011 | Shigeta | |
| 2013/0286443 A1* | 10/2013 | Massicot et al. | 358/3.28 |

FOREIGN PATENT DOCUMENTS

| | | |
|---|---|---|
| FR | 2817356 A1 | 5/2002 |
| JP | 08-052930 | 2/1996 |
| JP | 3706385 | 9/2004 |
| JP | 4008952 | 12/2005 |
| JP | 2006-190270 A | 7/2006 |
| JP | 4088936 | 11/2007 |
| JP | 2011-025503 | 2/2011 |
| WO | WO-2010/018687 A1 | 2/2010 |

OTHER PUBLICATIONS

International Search Report for PCT/JP2012/058125 issued May 22, 2012.

Extended European Search report issued May 26, 2015 for corresponding European Application No. 12765289.9.

Chinese Office Action issued Aug. 31, 2015 for corresponding Chinese Application No. 201280012832.4.

* cited by examiner

FIG.1

(a) Front surface side (b) Back surface side

INFORMATION DISPLAY SYSTEM AND DOT PATTERN PRINTED MATERIAL

TECHNICAL FIELD

The present invention relates to an information display system, in which information data on multimedia information such as a moving image is printed in an optically readable dot pattern, and a dot pattern printed material to be used for the same.

There have conventionally and often been conducted such operations of printing an optically readable code containing information data and optically reading the printed code, to thereby display the information.

There is an information display system using, as one kind of the optically readable code, a one-dimensional code (barcode) that is affixed to a price tag of a commercial product in advance and is read by an infrared scanner at the time of checkout, to thereby obtain information such as a price thereof.

There is also known an information display system in which a two-dimensional matrix code containing specific uniform resource locator (URL) information is printed in advance and is read by a camera of a mobile phone having a code reading function, to thereby guide a user to the link destination URL via the Internet.

Further, there is proposed an icon formed on a medium (Patent Document 1, Abstract). In a system using this icon, in order to recognize various kinds of multimedia information, dots are generated based on a dot code generating algorithm, a dot pattern portion is formed on a medium such as a printed material so that the dots are arrayed following a predetermined rule, the medium is read by reading means to obtain image data, the image data is converted into code data, multimedia information associated with the code data is read from storage means, and the multimedia information is reproduced. The techniques according to Patent Documents 2 to 5 are also proposed.

PRIOR ART DOCUMENTS

Patent Documents

Patent Document 1: JP 2006-190270 A
Patent Document 2: JP 4088936 B
Patent Document 3: JP 3706385 B
Patent Document 4: JP 4008952 B
Patent Document 5: WO 2010/018687

SUMMARY OF THE INVENTION

Problems to be Solved by the Invention

The inventor of the present invention has eagerly studied to find that an even less visible dot pattern may be printed, and thus completed the present invention.

The present invention has an object to provide an information display system and a dot pattern printed material to be used for the same, which are capable of easily displaying information only by reading a dot pattern, easy for update of the information, and capable of printing an even less visible dot pattern as compared to the conventional case.

Means for Solving Problems

In order to solve the above-mentioned problem, according to the present invention, there is provided an information display system, including: a dot pattern printed material including a dot pattern having coordinate position code information, the dot pattern being printed on a printing object through gravure printing in a less visible and optically readable manner; optical reading means for optically reading the coordinate position code information; information transfer means for transferring, to a server device, the coordinate position code information that is read by the optical reading means; the server device for outputting associated information that is accumulated in advance in association with the coordinate position code information; and information display means for displaying the associated information output from the server device, in which the dot pattern printed material is obtained by printing the dot pattern through the gravure printing with carbon black ink on a black printing layer that is formed with cyan ink, magenta ink, and yellow ink.

The color of black is obtained by mixing the cyan (C), magenta (M), and yellow (Y) ink together. As described above, the dot pattern is printed through the gravure printing with the carbon black ink on the black printing layer that is printed in black with the cyan (C), magenta (M), and yellow (Y) ink, and thus the dot pattern becomes even less visible as compared to the conventional case.

The black printing layer may be printed through gravure printing using three ink layers including a cyan (C) ink layer, a magenta (M) ink layer, and a yellow (Y) ink layer. Alternatively, the black printing layer may be printed through gravure printing with ink obtained by mixing the cyan (C) ink, the magenta (M) ink, and the yellow (Y) ink together.

In order to print the dot pattern having the coordinate position code information through the gravure printing so that the dot pattern is less visible and optically readable, a dot pattern described in Patent Document 3 may be employed. Further, when a fine dot pattern is printed through the gravure printing by using carbon black ink that absorbs only an infrared ray, a dot pattern less visible to a person and optically readable is obtained.

As described above, the dot pattern is printed through the gravure printing so as to be less visible and optically readable, and accordingly such an advantage is produced that only necessary letters and pictures can be printed on the print surface because the dot pattern is invisible to a person.

It is preferred that the printing object be a transparent and flexible sheet such as a flexible packaging material using a thin plastic film.

To obtain the dot pattern, the dot pattern technique described in Patent Document 3 is applicable, in which a predetermined number of information pieces on fine dot formation positions are combined as a minimum code. The dot pattern is printed through gravure printing, and accordingly such an advantage is produced that a high-resolution dot pattern can be obtained and the dot pattern can be printed even on a flexible, transparent film.

Further, the optical reading means to be used may be optical reading means sensitive to an infrared ray, and a dot pattern reading unit described in Patent Document 4 may be employed.

Further, it is preferred that the dot pattern printed material includes: an outer sheet; the black printing layer printed on a back surface of the outer sheet through the gravure printing; the dot pattern printed on the black printing layer through the gravure printing; a white ink layer printed on the dot pattern with white ink through the gravure printing; and an inner sheet provided on the white ink layer, and that a coordinate system of the dot pattern be printed in a state of being inverted with respect to a coordinate system viewed from a front surface side of the outer sheet so that the dot pattern is read by the optical reading means through the outer sheet from the front surface side of the outer sheet.

It is preferred that the gravure plate to be used for the gravure printing be produced by a laser platemaking method because a high-resolution and fine dot pattern can be obtained through the printing.

Further, the dot pattern printed material may be a food packaging film for packaging a food product, and the server device may accumulate in advance information on an origin of the food product in association with the coordinate position code information, to thereby display the information on the origin of the food product on the information display means.

The dot pattern printed material of the present invention is a dot pattern printed material to be used for the information display system, and the dot pattern printed material includes a dot pattern printed through gravure printing with carbon black ink on a black printing surface that is printed through the gravure printing with cyan ink, magenta ink, and yellow ink.

The present invention produces such a noticeable effect as to provide the information display system and the dot pattern printed material to be used for the same, which are capable of easily displaying information only by reading the dot pattern, easy for update of the information, and capable of printing the even less visible dot pattern as compared to the conventional case.

MODES FOR CARRYING OUT THE INVENTION

DESCRIPTION OF EMBODIMENT

An embodiment of the present invention is described below, but the embodiment is merely described as an example, and naturally, various modifications may therefore be made without departing from the technical idea of the present invention.

Figure 1:
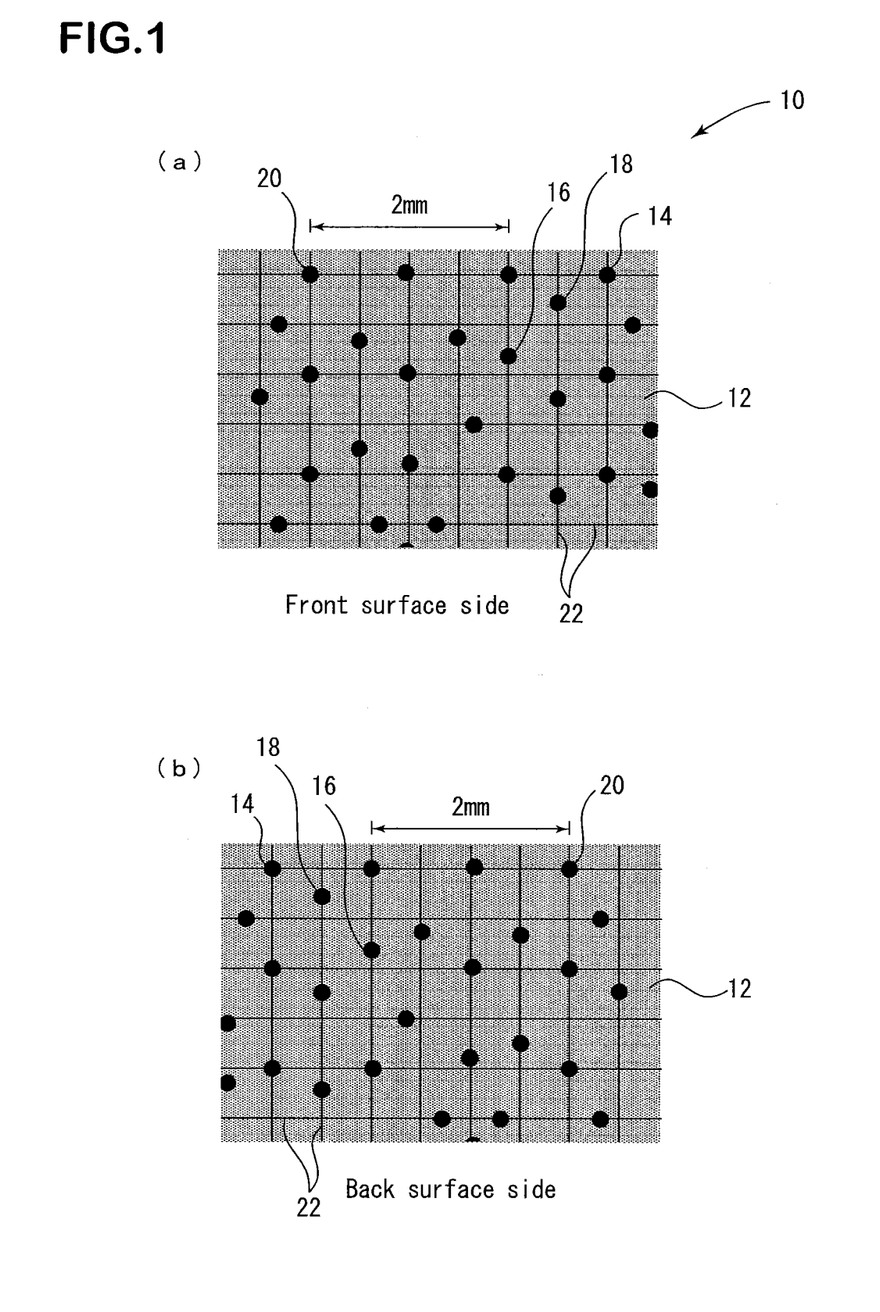
FIG. 1 is Illustrations of an example of a dot pattern printed material according to the present invention.

In FIG. 1, reference numeral 10 represents a dot pattern printed material. The dot pattern printed material 10 includes a dot pattern 14 printed through gravure printing on a black printing layer 12, which is formed on a transparent and flexible sheet as a printing object with cyan (C), magenta (M), and yellow (Y) ink. The dot pattern 14 may be printed on a back surface of the printing object in an inverted manner as described in Patent Document 5, or may be printed on a front surface of the printing object by a general method.

The dot pattern 14 is printed on the transparent and flexible sheet as the printing object with carbon black ink in a less visible and optically readable manner, and this dot pattern 14 has coordinate position code information. In the example of the figure, as is clearly illustrated in FIG. 5, the dot pattern printed material 10 includes an outer sheet 34, the black printing layer 12 printed on a back surface of the outer sheet 34 through gravure printing, the dot pattern 14 printed on the black printing layer 12 through gravure printing, a white ink layer 36 printed on the dot pattern 14 with white ink through gravure printing, and an inner sheet 38 provided on the white ink layer 36. The dot pattern 14 is printed on the black printing layer through gravure printing, and a coordinate system of the dot pattern 14 is printed in a state of being inverted with respect to a coordinate system viewed from a front surface side of the outer sheet 34 so that the dot pattern 14 is read by optical reading means 24 through the outer sheet 34 from a front surface 42 side of the outer sheet 34.

In other words, the coordinate system of the dot pattern 14 is printed on a back surface 44 side in a state of being inverted with respect to the coordinate system viewed from the front surface side of the outer sheet 34 so that the coordinate system of the dot pattern 14 on the front surface side illustrated in FIG. 1(a) has a mirror image relationship with the coordinate system of the dot pattern 14 on the back surface side illustrated in FIG. 1(b).

To obtain the dot pattern 14 having the coordinate position code information, the dot pattern technique described in Patent Document 3 is applicable. In this dot pattern technique, a predetermined number of information pieces on fine dot formation positions are combined as a minimum code.

In the dot pattern technique described in Patent Document 3, as illustrated in FIG. 1, key dots 16, information dots 18, and lattice dots 20 are arrayed in accordance with a predetermined rule. The predetermined rule is described in Patent Document 3, and details thereof are therefore omitted herein. In Patent Document 3, as illustrated in FIG. 1, 5×5 lattice dots 20 are arranged about each key dot 16 defined as a center, and the information dots 18 are arranged around a virtual center point surrounded by four lattice dots 20, to thereby form a block of the dot pattern 14 that represents information. Arbitrary numerical information is defined in this block. The dot pattern 14 is read by the optical reading means as described in Patent Document 5 to extract the lattice dots, then extract the key dots 16 under a condition that no dot is formed at a position at which the lattice dot is supposed to be formed, and then extract the information dots 18. The information dots 18 are digitized to extract an information area and to numerically process the information. Based on the numerical information thus obtained, information and a program are output from the dot pattern 14. Note that, reference numeral 22 represents a reference line that is provided for convenience. For the basic configuration described above, the configuration described in Patent Document 5 may be employed.

Further, the dot pattern is printed through gravure printing. This is because high-resolution printing may be attained by the gravure printing.

Further, it is preferred that a gravure plate to be used for the gravure printing be produced by a laser platemaking method as described in Patent Document 5.

The dot pattern 14 is optically read by the optical reading means. As the optical reading means, the dot pattern reading unit described in Patent Document 4 is applicable. In the example of the figure, the dot pattern reading unit described in Patent Document 4 using an infrared LED is employed.

Figure 2:
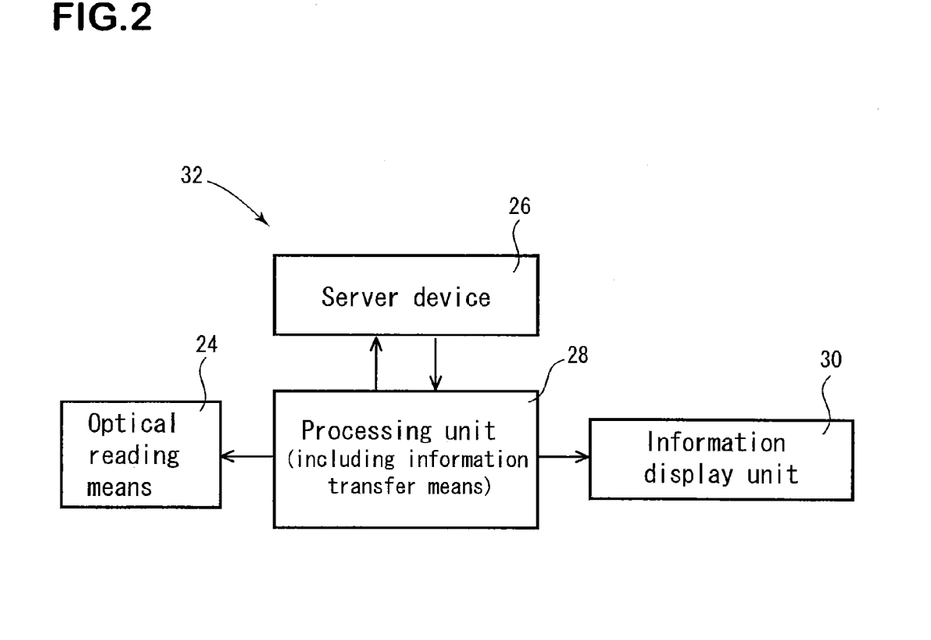
FIG. 2 is a block diagram illustrating a configuration of an information display system according to the present invention.

As illustrated in FIG. 2, an information display system 32 according to the present invention includes the dot pattern printed material 10 on which the dot pattern 14 having the coordinate position code information is printed through gravure printing in a less visible and optically readable manner, the optical reading means 24 for optically reading the coordinate position code information, a processing unit 28 (in the example of the figure, including information transfer means) for transferring, to a server device 26, the coordinate position code information that is read by the optical reading means 24, the server device 26 for outputting associated information that is accumulated in advance in association with the coordinate position code information, and an information display unit 30 serving as information display means for displaying information from the server device 26. The dot pattern printed material 10 includes the dot pattern 14 printed through gravure printing with carbon black ink on the black printing layer 12 that is formed with C, M, and Y ink.

In the example of the figure, the optical reading means 24 is an infrared scanner, the processing unit 28 is a personal computer, and the information display unit 30 is a PC display device. The server device 26 is connected to the Internet serving as a communication network. The server device 26 is a server device on which WWW server software (http daemon program) is to be operated, and includes necessary hardware (not shown) as typified by a storage medium such as a hard disk, a network communication device such as a modem, and the like. As the processing unit 28 serving as a client terminal, a notebook PC, a desktop PC, a mobile phone, or the like is connected to the Internet, and is communicable from/to the server device 26 in conformity to the TCP/IP protocol due to a web browsing function (WWW browser). Note that, as the processing unit 28 serving as a client terminal, any processing unit having the web browsing function (WWW browser) may be employed with no particular limitation on a manufacturer, a model, and the like. Further, the present invention is not limited to a single server device 26, and a plurality of server devices having similar functions may be prepared. Still further, the optical reading means 24 is to be used through connection to the processing unit 28 such as a personal computer via, for example, a universal serial bus (USB) connector.

Figure 3:
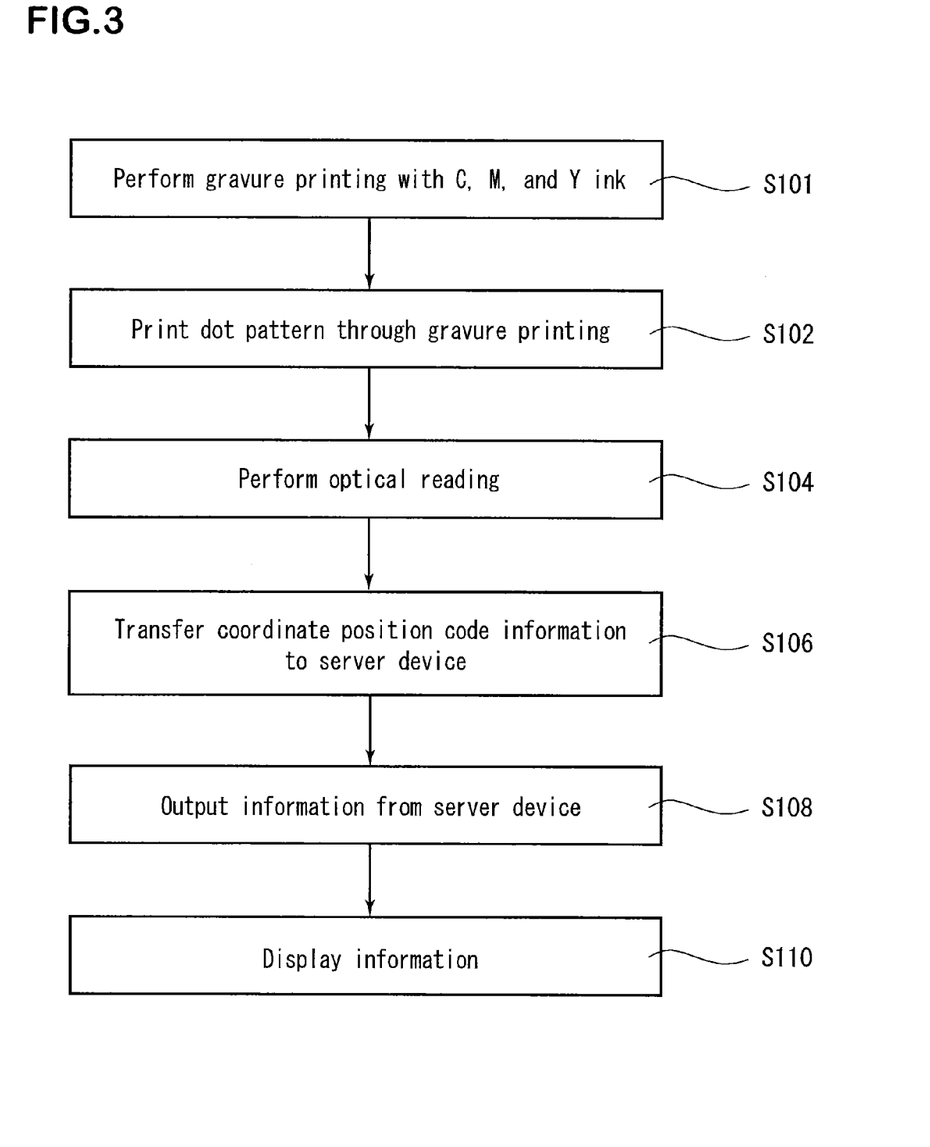
FIG. 3 is a flow chart illustrating a flow of processing to be performed in the information display system according to the present invention.

Next, referring to FIG. 3, description is given of a flow chart of the information display system 32 according to the present invention. First, the black printing layer 12 is produced with cyan (C), magenta (M), and yellow (Y) ink (Step 101). The dot pattern 14 is printed on the black printing layer 12 through gravure printing to produce the dot pattern printed material 10 (Step 102).

Subsequently, the dot pattern 14 is optically read by the optical reading means 24 (Step 104).

Subsequently, coordinate position code information of the dot pattern 14 is transferred to the server device 26 (Step 106).

Subsequently, the server device 26 outputs associated information that is accumulated in advance in association with the coordinate position code information (Step 108).

Subsequently, the output associated information is displayed on the information display unit (display device) 30 (Step 110).

Various kinds of information are conceivable as the associated information thus obtained, and the associated information is applicable for the purpose of adding, to a paper medium by using a moving image or voice, details of a picture book, English conversation, scenery on a trip, recipes for dishes, information on an origin of a food product, a product catalog, and the like. Thus, the information display system according to the present invention is applicable for the purpose of adding, to a paper medium by using a moving image or voice, details of a picture book, English conversation, scenery on a trip, recipes for dishes, information on an origin of a food product, a product catalog, and the like.

According to the present invention, information can easily be displayed only by reading the dot pattern. Further, a file accumulated in the server device 26 only needs to be updated to obtain the latest information, and hence the update is easy. Further, the dot pattern is even less visible as compared to the conventional case. Further, the dot pattern 14 is printed through gravure printing, and hence a high-resolution dot pattern can be obtained. Further, the dot pattern can be suitably printed even on a flexible sheet such as a transparent film.

EXAMPLE 1

A moving image was created and saved in the server device 26 in the office as an MPEG-4 moving image file. Contents of the moving image were advertisement of frozen fried chicken, indication of a best before date thereof, and introduction of a recipe therefor, and the moving image was about five minutes long.

Figure 5:
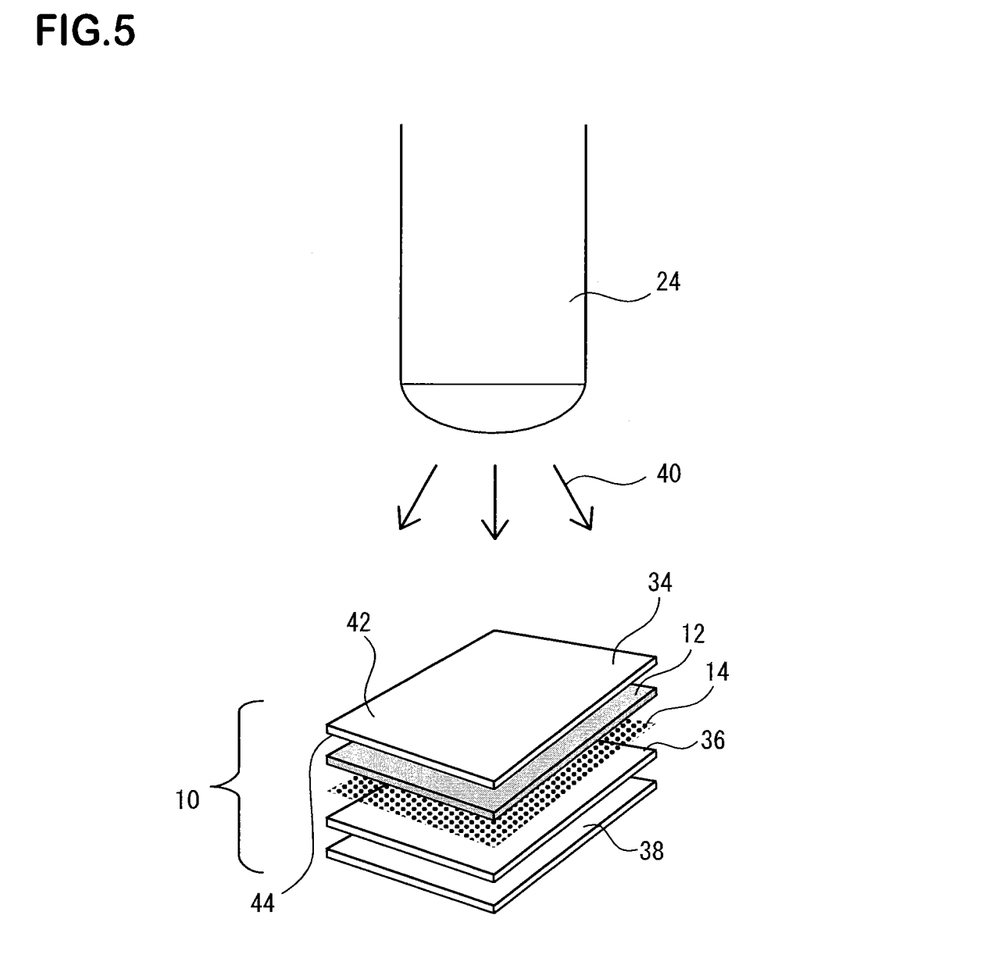
FIG. 5 is a schematic diagram illustrating one embodiment of the present invention.

As the optical reading means 24, Gscanner manufactured by Gridmark Inc. was employed. The optical reading means 24 was connected to a personal computer 28 through USB connection. Note that, reference numeral 40 represents an infrared ray.

Laser platemaking was performed using a laser gravure platemaking machine manufactured by Think Laboratory Co., Ltd. (product name: FX80, a fully automatic laser gravure platemaking system), to thereby produce a gravure platemaking roll having gravure cells that were each 13 μm deep and 30 μm square. Using this gravure platemaking roll, the black printing layer 12 was produced on a film with cyan (C), magenta (M), and yellow (Y) ink through operation of a printer manufactured by Nakajima Seiki Engineering Co., Ltd. (product name: PROTEC) at a printing speed of 200 m/min. The dot pattern 14 was printed on the black printing layer 12 with black infrared absorbing ink containing carbon black, to thereby produce the dot pattern printed material 10. As the dot pattern 14, key dots, information dots, and lattice dots were arrayed in accordance with a predetermined rule. The dot size of the printed dot pattern was 40 μm square.

The personal computer 28 has application software installed therein, and due to the application software, the coordinate position code information of the dot pattern 14 is associated with the moving image file in the server device 26.

Then, the optical reading means 24 was pressed against the film (dot pattern printed material 10) having the dot pattern 14 printed thereon, to thereby optically read the dot pattern 14. Due to the application software installed in the personal computer 28, the moving image file associated with the coordinate position code information of the dot pattern 14 was reproduced on the PC display device serving as the information display unit 30 of the personal computer 28.

EXAMPLE 2

Figure 4:
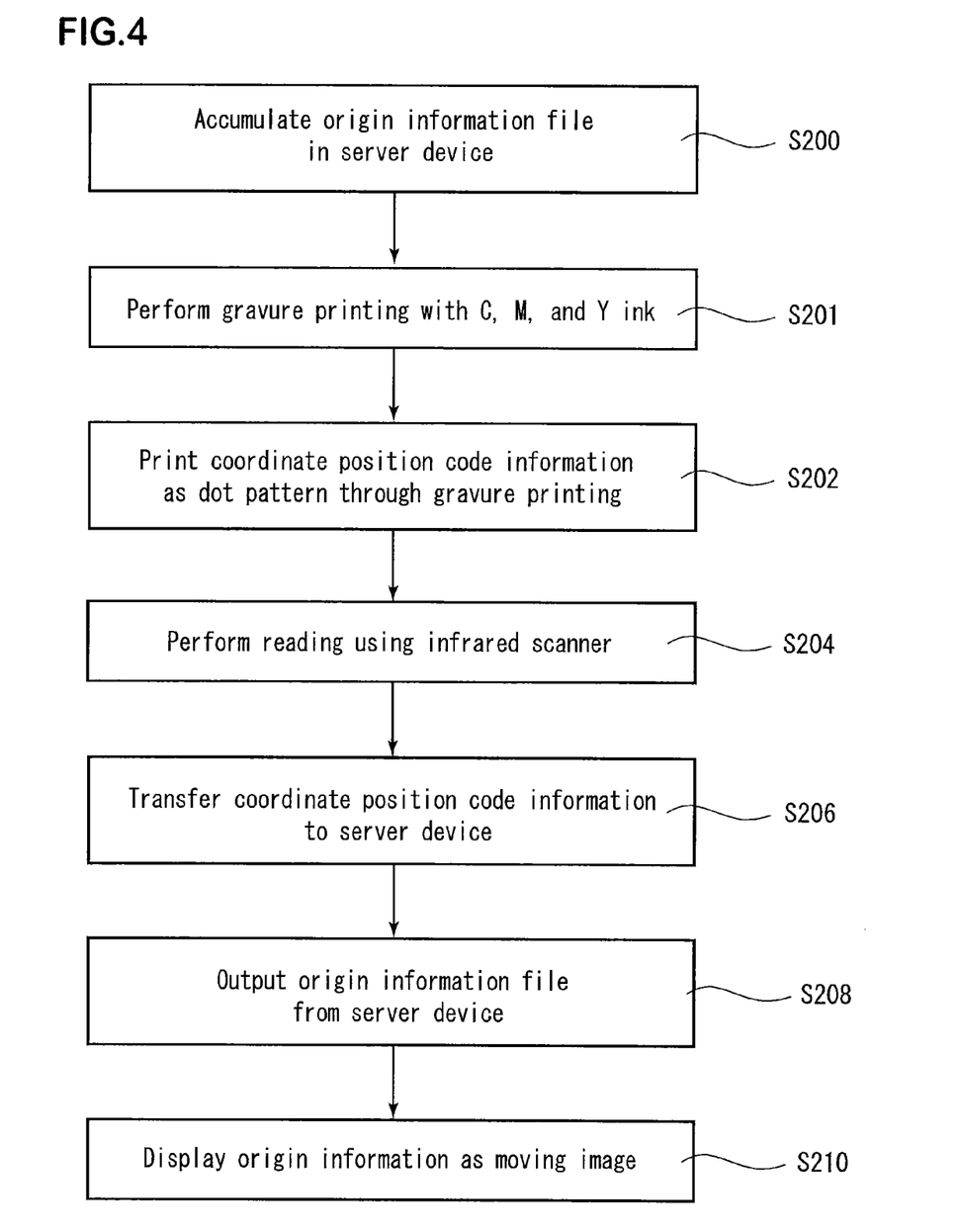
FIG. 4 is a flow chart in which the information display system according to the present invention is applied to indication of an origin of a food product.

Next, referring to FIG. 4, description is given of an example in which the information display system according to the present invention is applied to indication of an origin of a food product.

Described below is an example in which the information display system is applied to indication of an origin of beef. First, information on the origin was obtained as an electronic file by a beef producer who recorded himself/herself and his/her beef cattle and input voice, and the obtained file was accumulated in the server device 26 (Step 200).

Then, the beef was packaged with a film being the dot pattern printed material 10. The film described in Example 1 was employed as the film. The black printing layer 12 was produced on a film with cyan (C), magenta (M), and yellow (Y) ink (Step 201). The dot pattern 14 was printed on the black printing layer 12 to produce the dot pattern printed material 10. At this time, the dot pattern 14 was printed next to the word "beef" indicating the content through gravure printing under the same condition as that of Example 1. The dot pattern was printed by using black infrared absorbing ink containing carbon black so as to be converted into coordinate position code information expressed by numerical values, to thereby create the dot pattern printing sheet 10 (Step 202).

Note that, in a case of a food packaging film, there is often and generally conducted such an operation that a pigmented layer and a white ink layer (underlayer) are provided on a back surface of an outer sheet serving as the outermost layer and an inner sheet different from the outer sheet is further laminated thereon. This operation is conducted so as to laminate the innermost layer to be brought into contact with a food product or the like.

Subsequently, an infrared scanner that was the optical reading means 24 was pressed, to thereby optically read the dot pattern 14 (Step 204). The infrared scanner 24 was connected to the personal computer 28 (processing unit) through a universal serial bus (USB), and due to application software installed in the personal computer 28, the coordinate position code information of the dot pattern 14 was immediately transferred to the server device 26 via the Internet (Step 206). In other words, jump to the link destination server device 26 occurred.

Subsequently, the server device 26 output the associated information that was accumulated in advance in association with the coordinate position code information, that is, the origin information file recorded in advance (Step 208).

Subsequently, the output associated information was displayed on the information display unit 30 serving as the information display means (display device) (Step 210). In this manner, the information obtained by the beef producer who recorded himself/herself and his/her beef cattle and input voice was displayed as a moving image.

As described above, the information obtained by the beef producer who records himself/herself and his/her beef cattle and inputs voice is displayed as a moving image, and thus consumers can purchase the beef with no anxiety.

With this configuration, the origin information file in the server device 26 is kept updated to obtain the latest information, and accordingly such an advantage is also produced that consumers can always receive the latest information without newly printing the dot pattern.

Further, the dot pattern is printed through gravure printing, and the high-resolution dot pattern can be obtained. Further, the dot pattern can be suitably printed even on a flexible sheet such as a transparent film.

Industrial Applicability

The information display system and the dot pattern printed material according to the present invention are applicable to any object for the purpose of adding, to a paper medium using a moving image or voice, details of a picture book, English conversation, scenery on a trip, recipes for dishes, information on an origin of a food product, a product catalog, and the like, which are configured to output sound and a moving image. Further, with the dot pattern printed in advance, the information display system and the dot pattern printed material according to the present invention are also applicable to prevention of forgery of bills and documents, and further to certification of authorized products manufactured in an own company. Thus, the information display system and the dot pattern printed material according to the present invention may be used suitably as means for discrimination between authorized products and forged products.

REFERENCE SIGNS LIST

10: dot pattern printed material of the present invention, 12: black printing layer, 14: dot pattern, 16: key dot, 18: information dot, 20: lattice dot, 22: reference line, 24: optical reading means, 26: server device, 28: processing unit, personal computer, 30: information display unit (information display means), 32: information display system of the present invention, 34: outer sheet, 36: white ink layer, 38: inner sheet, 40: infrared ray, 42: front surface, 44: back surface

The invention claimed is:

1. An information display system, comprising:
   a dot pattern printed material comprising a dot pattern having coordinate position code information, the dot pattern being printed on a printing object through gravure printing in a less visible and optically readable manner,
   optical reading means for optically reading the coordinate position code information;
   information transfer means for transferring, to a server device, the coordinate position code information that is read by the optical reading means;
   the server device for outputting associated information that is accumulated in advance in association with the coordinate position code information; and
   information display means for displaying the associated information output from the server device, wherein
   the dot pattern printed material is obtained by printing the dot pattern through the gravure printing with carbon black ink on a black printing layer that is formed with cyan ink, magenta ink, and yellow ink,
   the dot pattern printed material comprises:
     an outer sheet;
     the black printing layer printed on a back surface of the outer sheet through the gravure printing;
     the dot pattern printed on the black printing layer through the gravure printing;
     a white ink layer printed on the dot pattern with white ink through the gravure printing; and
   an inner sheet provided on the white ink layer, and wherein
   a coordinate system of the dot pattern is printed in a state of being inverted with respect to a coordinate system viewed from a front surface side of the outer sheet so that the dot pattern is read by the optical reading means through the outer sheet from the front surface side of the outer sheet.

2. An information display system according to claim 1, wherein a gravure plate to be used for the gravure printing is produced by a laser platemaking method.

3. An information display system according to claim 1, wherein the printing object comprises a transparent and flexible sheet.

4. An information display system according to claim 1,
   wherein the dot pattern printed material comprises a food packaging film for packaging a food product, and
   wherein the server device accumulates in advance information on an origin of the food product in association with the coordinate position code information, to thereby display the information on the origin of the food product on the information display means.

5. A dot pattern printed material to be used for the information display system according to claim 1,
   the dot pattern printed material comprising a dot pattern printed through gravure printing with carbon black ink on a black printing surface that is printed through the gravure printing with cyan ink, magenta ink, and yellow ink.

6. A dot pattern printed material comprising:
   an outer sheet;
   a black printing layer printed on a back surface of the outer sheet through the gravure printing;

a dot pattern printed on the black printing layer through the gravure printing;

a white ink layer printed on the dot pattern with white ink through the gravure printing; and an inner sheet provided on the white ink layer, and wherein a coordinate system of the dot pattern is printed in a state of being inverted with respect to a coordinate system viewed from a front surface side of the outer sheet so that the dot pattern is read by an optical reading means through the outer sheet from the front surface side of the outer sheet.

\* \* \* \* \*